United States Patent [19]

Fukuzuka et al.

[11] 4,107,024
[45] Aug. 15, 1978

[54] ELECTROLYTIC CELL WITH ELECTRODES ARRANGED AS A HEXAGON

[75] Inventors: Toshio Fukuzuka; Kazutoshi Shimogori, both of Kobe; Hiroshi Satoh, Suita, all of Japan

[73] Assignee: Kobe Steel, Ltd., Kobe, Japan

[21] Appl. No.: 797,880

[22] Filed: May 18, 1977

[30] Foreign Application Priority Data

May 18, 1976 [JP] Japan .................................. 51-57517

[51] Int. Cl.² .............................................. C25B 9/00
[52] U.S. Cl. .................................... 204/275; 204/149; 204/280
[58] Field of Search ............... 204/275, 269, 276–278, 204/263, 242, 257, 271, 149, 280, 286; 429/119

[56] References Cited

U.S. PATENT DOCUMENTS

| | | | |
|---|---|---|---|
| 1,796,715 | 3/1931 | Kirkaldy | 204/196 |
| 3,222,269 | 12/1965 | Stanton | 204/242 X |
| 3,841,989 | 10/1974 | Delsa | 204/277 X |
| 3,875,039 | 4/1975 | Matusek et al. | 204/294 X |
| 3,893,900 | 7/1975 | Teshima et al. | 204/269 X |
| 3,953,314 | 4/1976 | Spaller, Jr. | 204/275 X |

Primary Examiner—Charles F. LeFevour
Attorney, Agent, or Firm—Oblon, Fisher, Spivak, McClelland & Maier

[57] ABSTRACT

An electrolytic cell for use in various electrolytic treatments such as the sterilization of sea water includes a plurality of monopolar bar type electrodes, and an electrolytic solution filled in clearances between the electrodes. At least one group of electrodes disposed in the electrolytic cell is arranged so that one electrode is located at the center of an equilateral hexagon and the other electrodes are located at apexes of the hexagon.

8 Claims, 9 Drawing Figures

ELECTROLYTIC CELL WITH ELECTRODES ARRANGED AS A HEXAGON

BACKGROUND OF THE INVENTION

1. Field of the Invention

The present invention relates generally to electrolytic cells and more particularly to an electrolytic cell wherein at least one group of electrodes is arranged so that one electrode is located at the center of an equilateral hexagon and the other electrodes are located to apexes of the hexagon.

2. Description of the Prior Art

Various types of electrolytic cells have heretofore been developed as electrolysis apparatuses, and in most of these known electrolytic cells, plate electrodes are disposed in the cell and the size of the cell has often to be enlarged. Further, in electrolytic cells including plate electrodes, stagnation of electrolytic solutions is readily caused and substances formed by electrolysis are deposited and accumulated on the electrodes. Accordingly, the conventional electrolytic cells still involve problems to be solved.

For example, when sodium hypochlorite to be used for the sterilization treatment is prepared by electrolysis of sea water, the following defects are observed if conventional electrolytic cells are used.

A liquid chlorine injecting method has heretofore been most popular as the method for sterilization of water, but this method involves problems as regards the safety and running cost. Accordingly, a method including directly eletrolyzing sea water to form sodium hypochlorite and injecting the so formed hypochlorite into water to effect the sterilization treatment has now attracted attention in the art and this method is in practical use in some plants. However, when sea water is directly electrolyzed by using conventional electrolytic cells, the efficiency of generation of chlorine is not sufficiently high and during the operation, magnesium hydroxide is deposited on electrodes, especially cathodes and the deposited magnesium hydroxide grows and finally clogs the cell. Moreover, in order to treat a large quantity of sea water at a high efficiency, the size of the cell must inevitably be large.

SUMMARY OF THE INVENTION

It is a primary object of the present invention to provide an electrolytic cell which can provide a very high electrolysis efficiency very stably in any electrolytic treatment.

A further object of the present invention is to provide an electrolytic cell which has a compact structure and can be assembled and disassembled very easily and in which the manufacturing cost can be reduced and the maintenance can be remarkably facilitated.

A third object of the present invention is to provide an electrolytic cell in which the running cost can be reduced and the electrolytic treatment can be accomplished economically advantageously.

In accordance with the first aspect of the present invention attaining the foregoing objects, there is provided an electrolytic cell including a plurality of monopolar bar type electrodes, an electrolytic solution being filled in clearances between the electrodes, wherein at least one group of electrodes is arranged so that one electrode is located at the center of an equilateral hexagon and other electrodes are located at apexes of the hexagon, and wherein the ratio of the total number of cathodic bar type electrodes most adjacent to respective anodic bar type electrodes to the total number of the anodic bar type electrodes is at least 2, preferably 2.5 to 4.

In accordance with the second aspect of the present invention, there is provided an electrolytic cell as set forth in the first aspect wherein both ends of the bar type electrodes are supported by a pair of insulating members, one end of the cathodic bar type electrodes being fitted in the insulating member on one side and one end of the anodic bar type electrodes being allowed to pierce through the insulating member on one side, the other end of the anodic bar type electrodes being fitted in the insulating member on the other side and the other end of the cathodic bar type electrodes being allowed to pierce through the insulating member on the other side, and wherein the piercing ends of the cathodic and anodic bar type electrodes are engaged with tulip-like holding pieces capable of elastic opening and closing, which are mounted on cathodic or anodic terminals disposed outside the insulating members, so that the piercing ends fall in contact with the cathodic or anodic terminals.

In accordance with the third aspect of the present invention, there is provided an electrolytic cell as set forth in the first or second aspect wherein the electrolytic cell proper has a cylindrical shape, annular cylindrical water chambers are formed on the peripheral faces of the electric cell on both the ends thereof, a number of communication holes are formed to communicate the water chambers with the interior of the electrolytic cell, and wherein water-sucking and water-discharging openings of the water chambers are located at the same level as the level of the end face of the electrolytic cell.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein.

DETAILED DESCRIPTION OF THE PREFERRED EMBODIMENTS

The present invention will now be described in detail by reference to embodiments illustrated in the accompanying drawings.

Figure 1:
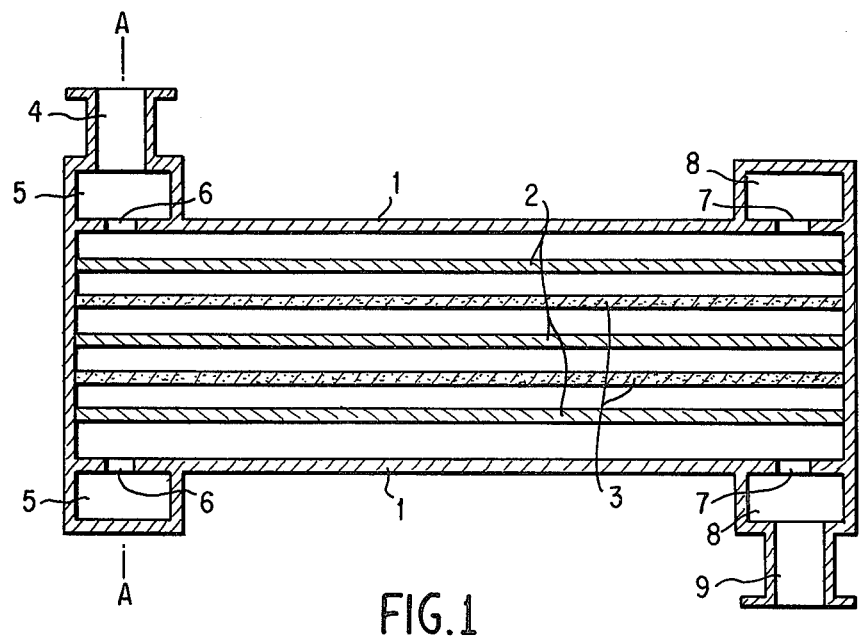
FIG. 1 is a longitudinal sectional side view illustrating one embodiment of the electrolytic cell of the present invention.

Referring now to FIG. 1 which is a longitudinally sectional side view of the electrolytic cell of the present invention, reference numeral 1 represents a cylindrical electrolytic cell proper, and both the ends of the cell proper 1 in the longitudinal direction are closed. A number of bar type electrodes 2 and 3 are equidistantly disposed in the cell proper 1 in parallel to one another and to the longitudinal direction of the cell proper 1. Electrodes 2 are anodic electrodes and electrodes 3 are cathodic electrodes. In order to effect the intended electrolytic treatment by passing an electrolytic solution through the interior of the electrolytic cell proper 1, in the embodiment illustrated in FIG. 1, annular cylindrical water chambers 5 and 8 are disposed to surround both the terminal side faces of the cell proper 1 in the longitudinal direction thereof, and an inlet 4 is formed in one water chamber 5 and an exit 9 is formed in the other water chamber 8. On the respective terminal side faces of the cell proper 1 surrounded by the water chambers 5 and 8, small holes 6 and 7 are formed at prescribed intervals to communicate the water chambers 5 and 8 with the interior of the cell proper 1. The electrolytic solution passes through the inlet 4, the water chamber 5, the small holes 6, the cell proper 1, the small holes 7, the water chamber 8 and the exit in sequence, and during this travel, the electrolytic solution is subjected to the electrolytic treatment by the bar type electrodes 2 and 3.

When sea water is directly electrolyzed by the electrolytic cell having the above structure, sea water introduced in the inlet 4 undergoes reactions represented by the following formula (I) and a solution of sodium hypochlorite is discharged from the exit 9:

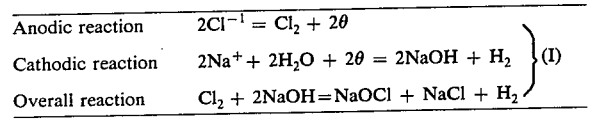

| Anodic reaction | $2Cl^{-1} = Cl_2 + 2\theta$ | |
|---|---|---|
| Cathodic reaction | $2Na^+ + 2H_2O + 2\theta = 2NaOH + H_2$ | (I) |
| Overall reaction | $Cl_2 + 2NaOH = NaOCl + NaCl + H_2$ | |

Figure 2:
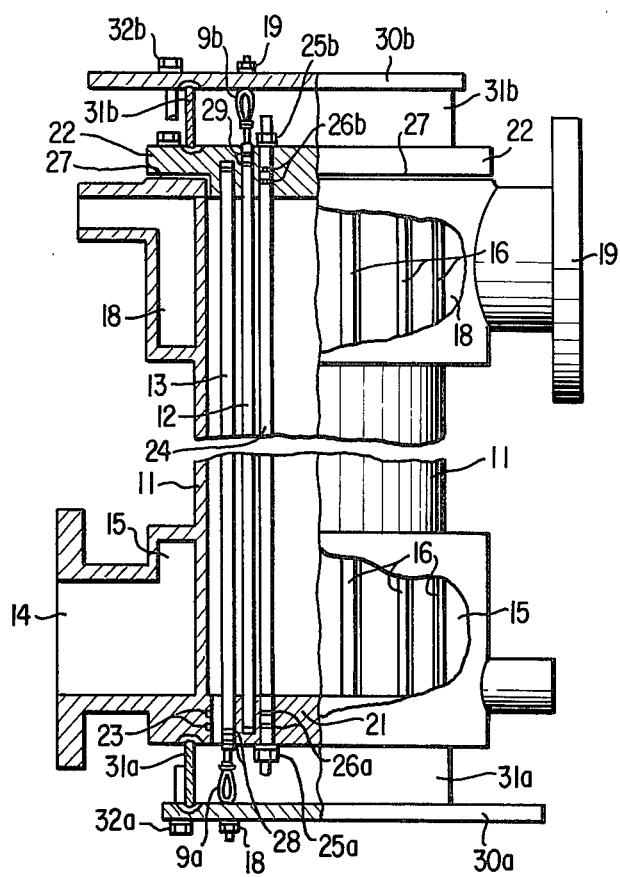
FIG. 2 is a longitudinal sectional view illustrating the electrode-connecting portion in one embodiment of the electrolytic cell of the present invention.
Figure 3:
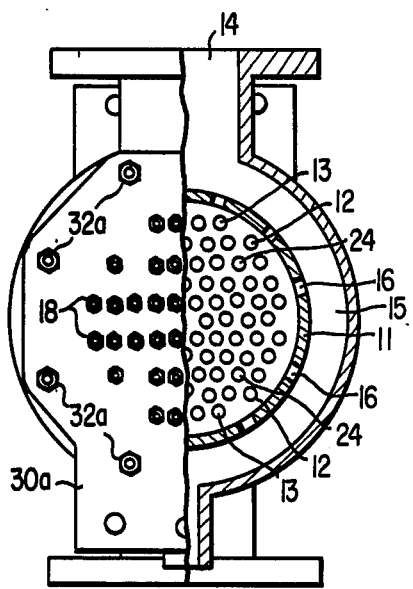
FIG. 3 is a cross-sectional view showing the electrode-connecting portion illustrated in FIG. 2.

FIGS. 2 and 3 illustrate the main portion of the structure connecting bar type electrodes to electrode terminals.

Both the ends of an electrolytic cell proper 11 in the longitudinal direction are opened so that a pair of insulating members 21 and 22 are attached to the terminal portions of the cell proper 11, and annular water chambers 15 and 18 are formed on the peripheral portions contiguous to the open ends. Anodic electrodes 12 and cathodic electrodes 13 are supported by the insulating members 21 and 22.

As illustrated in FIGS. 2 and 3, one insulating member 21 is a disc-like member dismountably fitted to one end opening on the side including an introduction inlet 14 and the water chamber 15, by means of a sealing member 23 such as an O-ring, and the other insulating member 22 is a two-staged disc-like member including a part fitted to the other end opening on the side having a liquid discharge exit 19 and the water chamber 18 and a part overlapped on the outer end face of the water chamber 18. A plurality of supporting rods 24 are disposed to pierce through both the insulating members 21 and 22 along the longitudinal direction of the electrolytic cell proper 11. Both ends of each supporting rod 24 are fixed to the outer surfaces of both the insulating members 21 and 22 through clamping nuts 25a and 25b, whereby the electrodes and insulating members are dismountably integrated. Sealing members 26a and 26b such as O-rings are disposed in portions of the supporting rods 24 that pierce through the insulating members 21 and 22, and another sealing member 27 such as a packing is disposed in the overlapped face area between the insulating member 22 and the water chamber 18.

A number of cathodes 13 and anodes 12 are arranged in parallel to one another between the insulating members 21 and 22. In one insulating member 21, the cathodes 13 are inserted so that one end of the cathodes 13 pierce through the insulating member 21 and one end of the anodes 12 is fitted in blind hole-like fitting portions formed on the insulating member 21. The piercing portions of the cathodes 13 are protected by sealing members 28 such as O-rings. In the other insulating member 22, one end of the cathodes 13 is fitted in fitting portions formed on the insulating member 22 and one end of the anodes 12 is inserted through sealing members 29 such as O-rings to pierce through the insulating member 22.

As will be apparent from the foregoing illustration, since either bar type anodes or cathodes protrude on the outside of each insulating member, the structure for applying electricity to groups of the cathodes 13 and anodes 12 can be simplified. More specifically, as illustrated in FIG. 3, it is sufficient to fix only a plate-like cathode terminal 30a covering all the cathodes 13 to the electrolytic cell proper 11 through a liner 31a and a clamping bolt 32a so that they are located in parallel to one another with respect to the insulating member 21.

Figure 4:
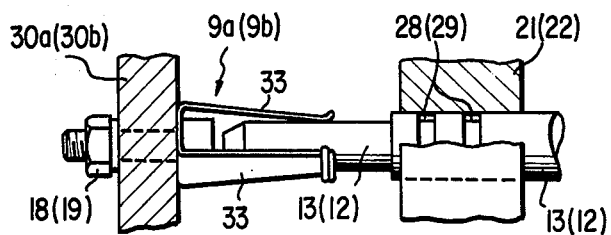
FIG. 4 is a view illustrating an electricity-applying contact portion in detail.

A contact 9a, to be electrically connected to one end of cathodic bar type electrodes 13, is mounted on the cathode terminal 30a. The structure of the contact 9a is not particularly critical so far as one end of the cathodic bar type electrodes is dismountably inserted in the contact 9a and electricity is applicable to the cathodes, but it is preferred that the contact 9a has a tulip-like structure including a holding piece 33 capable of opening and closing, as shown in FIG. 4. Similarly, a plate like anode terminal 30b covers all the anodes 12 to the electrolytic cell proper 11 through a liner 31b and a clamping bolt 32b so that they are located in parallel to one another with respect to the insulating member 22. Also, a contact 9b, to be electrically connected to one end of anode bar type electrode 12 is mounted on the anode terminal 30b and is similar in structure to that of contact 9a.

Further, the positional relationship of the water chamber 15 having an inlet 14 to small holes 16 of the cell proper 11 is set as shown in FIG. 3. More specifically, the annular cylindrical water chamber 15 is disposed concentrically with the cylindrical cell proper 11 so that the water chamber 15 surrounds the periphery of the cylindrical cell proper 11, and small holes 16 are formed equidistantly at prescribed intervals over the entire surface of the water chamber 15 on the peripheral side face of the cell proper 11, and in this arrangement, the electrolytic solution flows into the cell proper 11 through the inlet 14, the water chamber 15 and the holes 16, whereby the electrolytic solution flows very smoothly and uniformly. Furthermore, by virtue of the bar type electrodes 12 and 13 disposed equidistantly in the cell proper 11 in parallel to one another as well as the effect attained by the above arrangement, non-uniformity of streams of the electrolytic solutions is eliminated and a zone where the electrolytic solution is locally stagnant, namely a so-called dead zone, is not generated at all. In this point, the electrolytic cell of the present invention is especially advantageous over the conventional electrolytic cells.

For example, in case of the above-mentioned treatment of sea water, non-uniformity of streams of sea water in the cell proper 11 or local stagnation of sea water in the cell proper results in deposition of magnesium hydroxide on electrodes, especially anodic electrodes, and trouble is often caused by growth of the deposited magnesium hydroxide. According to the present invention, occurrence of such trouble can be completely prevented.

The arrangement of cathodic and anodic bar type electrodes in the electrolytic cell of the present invention having the above structure will now be described.

Figure 5:
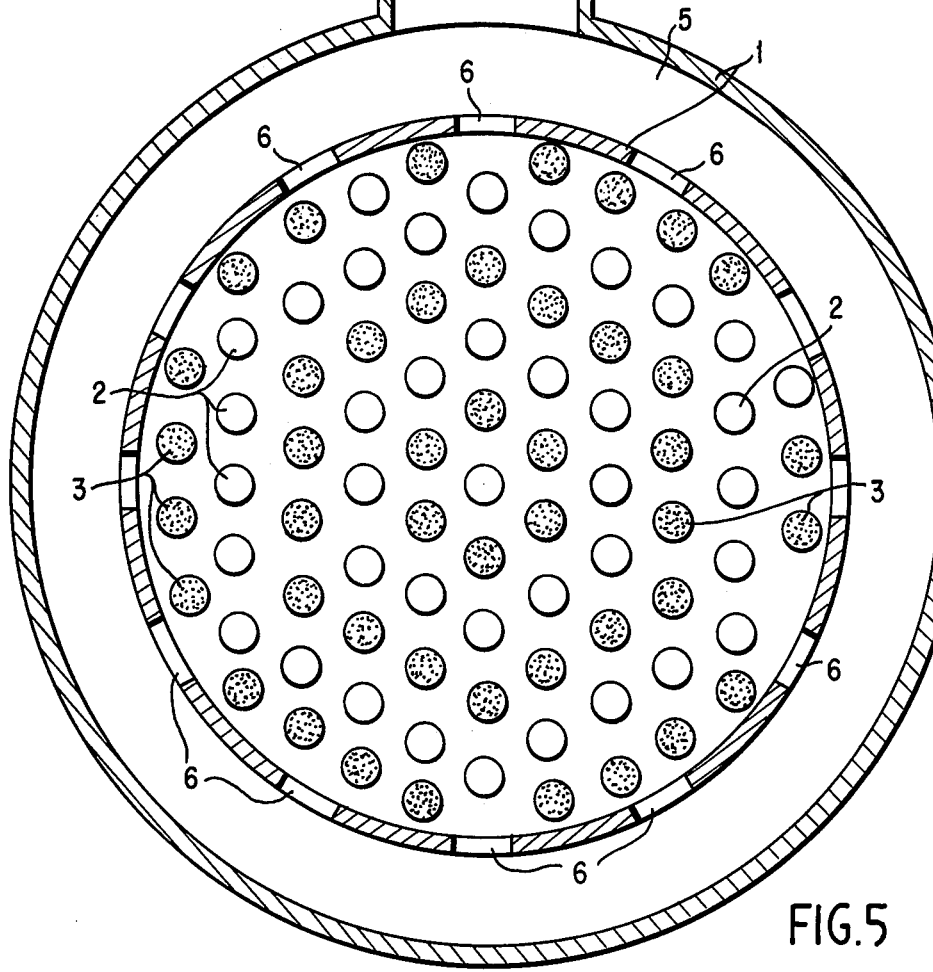
FIGS. 5, 6 and 7 each illustrate the section taken along the line A—A in FIG. 1 and showing examples of the electrode arrangement.

FIG. 5 shows a typical arrangement of bar type electrodes 2 and 3 with respect to the section taken along the position of the water chamber 5. Both the bar type anodes 2 and the bar type cathodes 3 are disposed in parallel to each other inside and outside concentric equilateral hexagons, and the distance between every two adjacent electrodes is equal among these electrodes 2 and 3.

Figure 6:
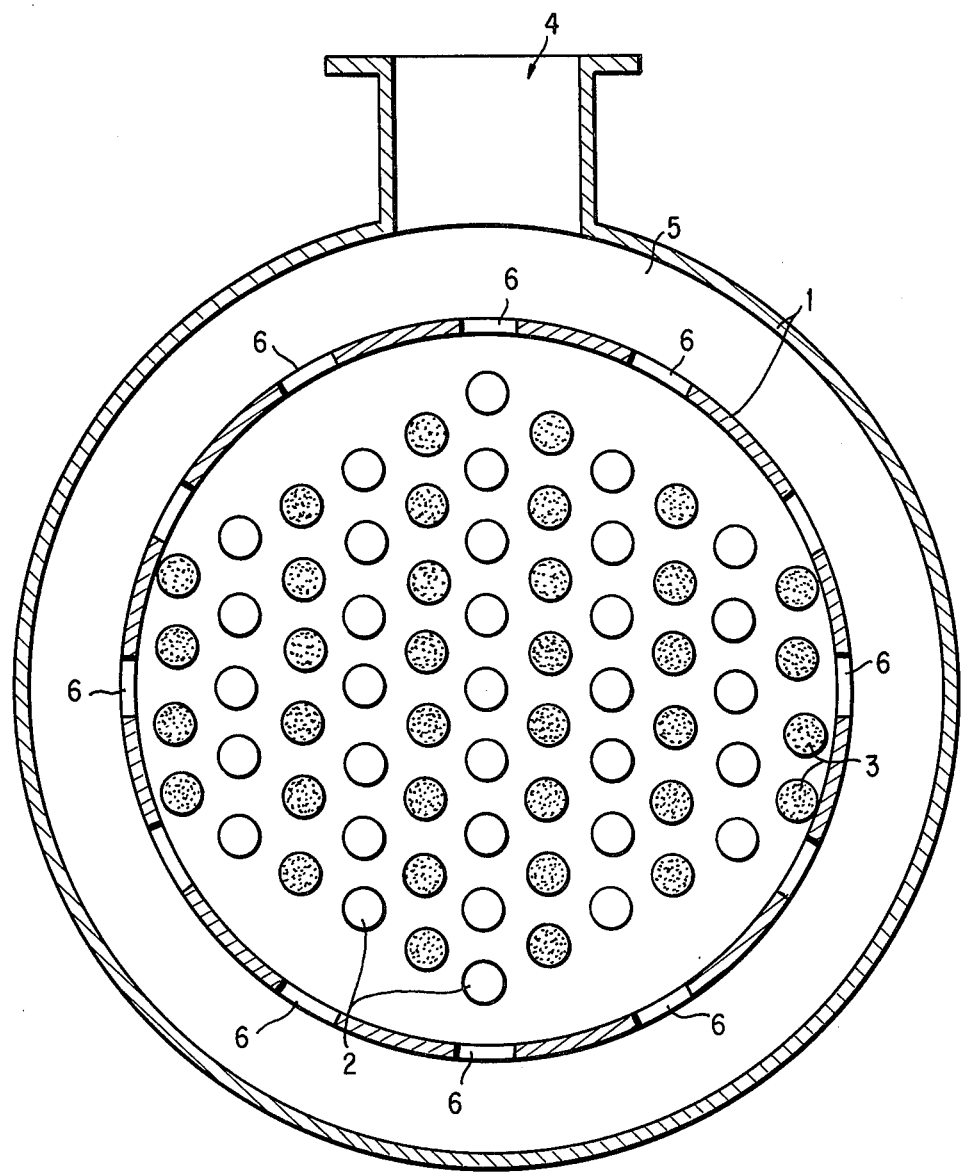
Figure 7:
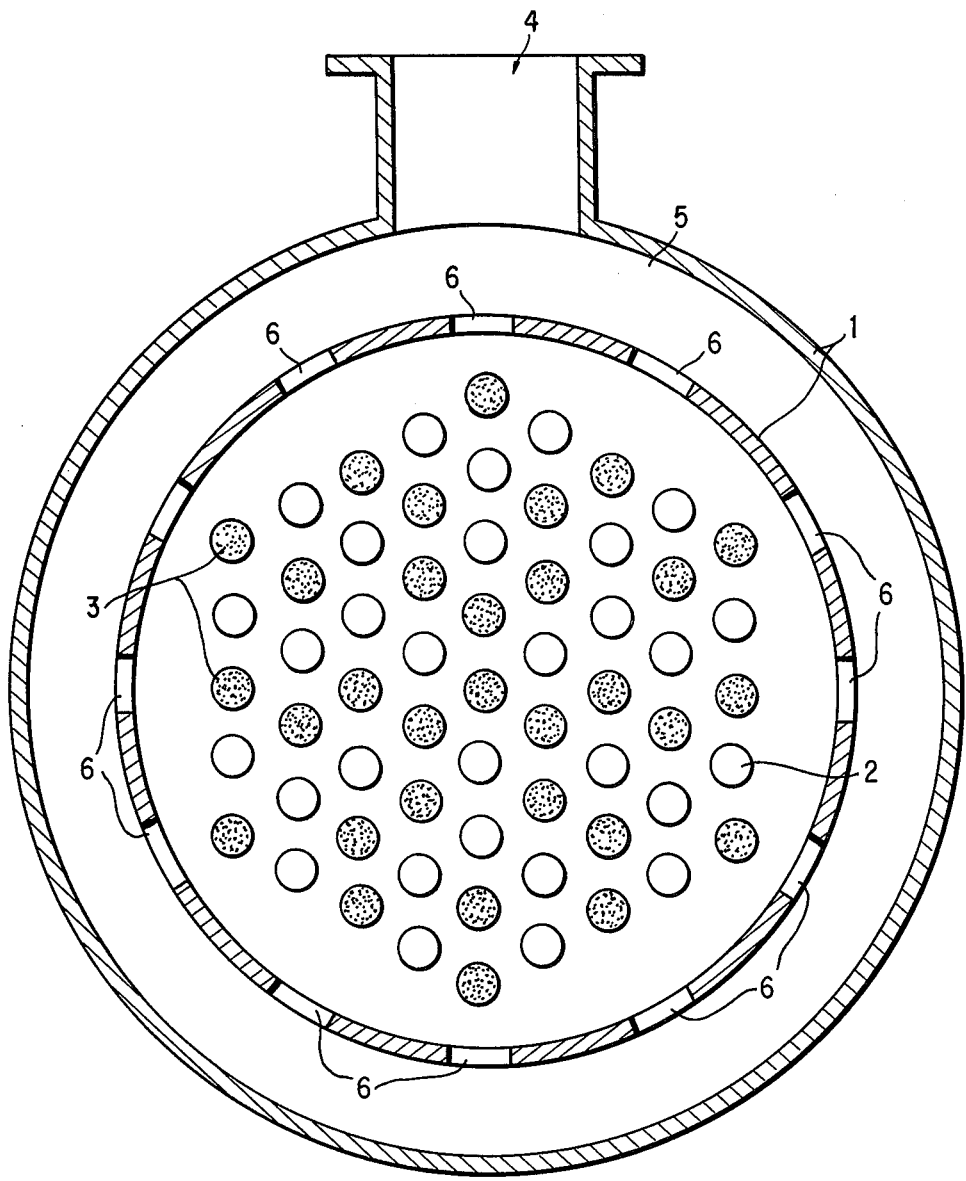

In addition to the equidistant arrangement of the bar type electrodes 2 and 3 shown in FIG. 5, where the electrodes 2 and 3 are equidistantly disposed outside and inside concentric hexagons there are illustrated other arrangements as shown in FIGS. 6 and 7. When the electrolytic treatment of sea water was actually conducted by using the arrangements shown in FIGS. 5, 6 and 7 and the efficiency of generation of chlorine was examined, it was found that good results were obtained in each arrangement. Based on these experimental results, arrangements of bar type electrodes as shown in FIGS. 5, 6 and 7 have been established according to the present invention.

In FIG. 6, a plurality of rows of linearly arranged anodic bar type electrodes 2 and a plurality of rows of linearly arranged cathodic bar type electrodes 3 are disposed alternately in parallel to one another, and the number of the electrodes arranged in one row is greatest in the central portion and this number is gradually decreased toward the outside.

In the arrangement illustrated on FIG. 7, in each side of each of the concentric hexagons, anodes and cathodes are arranged alternately, though in the arrangement shown in FIG. 5 concentric hexagons including anodes alone and concentric hexagons including cathodes alone are arranged alternately. Of course, in each of the arrangements shown in FIGS. 5, 6 and 7 the positions of the cathodes and anodes may be reversed though such arrangements are not specifically illustrated in the drawings, and in each of these arrangements, a high efficiency of generation of chlorine can similarly be attained during the electrolytic treatment of sea water.

In order to satisfy the above-mentioned arrangement requirements, it is preferred that bar type electrodes be used as the electrodes 2 and 3, and use of bar type electrodes is advantageous for providing smooth and uniform streams of the electrolytic solution. Moreover, when such bar type electrodes are used, a large number of electrodes can be disposed effectively in a relatively narrow space and therefore, it is possible to make the structure of the electrolytic cell compact, improve the efficiency of electrolysis and perform the operation economically advantageously.

In the embodiments illustrated in FIGS. 5 and 6, anodic and cathodic bar type electrodes are disposed regularly and alternately in concentric hexagons, but the arrangement of the electrodes is not limited to such regular arrangement and the electrodes may be arranged at random. In this case, however, it is necessary to arrange cathodic and anodic bar type electrodes so that the ratio of the total number of the cathodic bar type electrode most adjacent to respective anodic bar type electrodes to the total number of the anodic bar type electrodes is at least 2, preferably 2.5 to 4.

Figure 8:
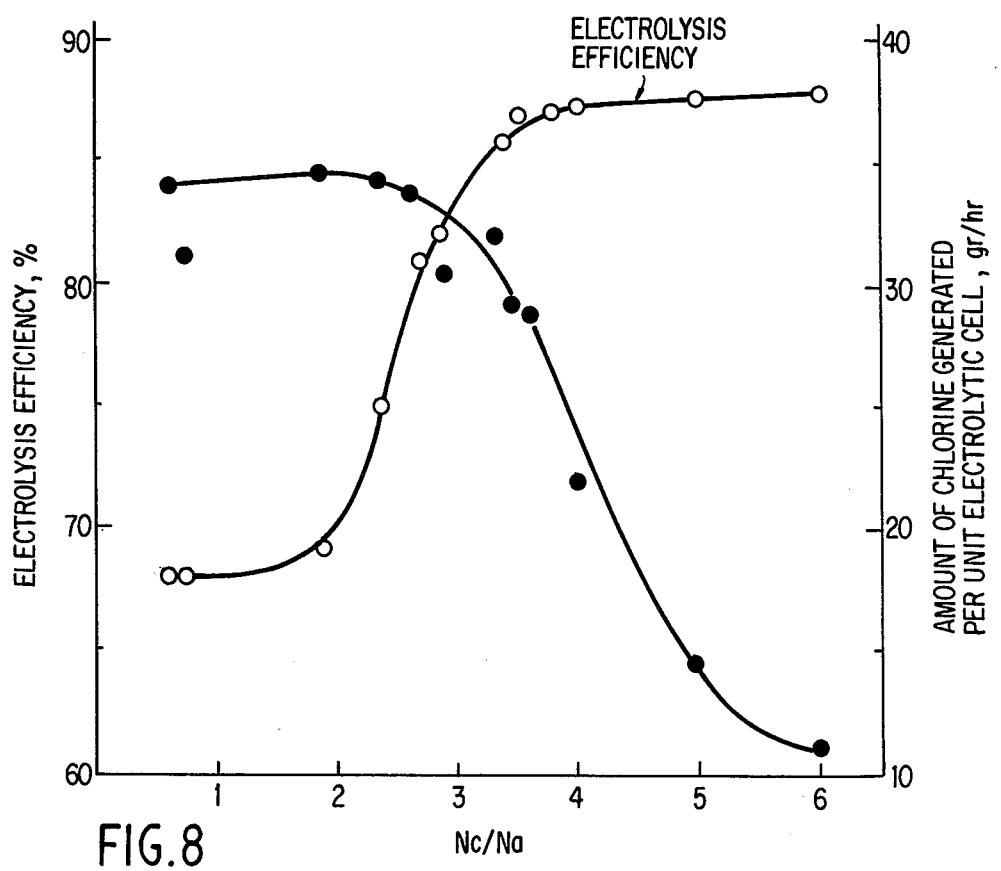
FIG. 8 is a view illustrating the relationship of the Nc/Na ratio of the electrolysis efficiency and the amount of chlorine generated.

FIG. 8 illustrates the relationship of the ratio of the total number (Nc) of cathodic bar type electrodes most adjacent to respective anodic bar type electrodes to the total number (Na) of the anodic bar type electrodes, namely the Nc/Na ratio, to the electrolysis efficiency and the amount of chlorine generated per unit electrolytic cell. As will be apparent from FIG. 8, a high electrolysis efficiency can be attained when the Nc/Na ratio is at least 2, preferably at least 2.5, and if the Nc/Na ratio exceeds 4, the defect that the amount of chlorine generated per unit electrolytic cell is reduced becomes rather conspicuous and overcomes the advantage that the electrolysis efficiency is enhanced. Accordingly, it is preferred that the Nc/Na ratio be up to 4.

Influences of the ratio of the numbers of cathodic and anodic bar type electrodes adjacent to each other on the electrolysis efficiency have now been explained. When the electrolysis is conducted by using a plurality of electrodes and it is desired to enhance the electrolysis efficiency as much as possible, not only the above-mentioned Nc/Na ratio but also the arrangement pattern of the electrodes is important. More specifically, in order to make uniform the current distribution and enhance the electrolysis efficiency, the bar type electrodes must be arranged so that the distance between every two adjacent electrodes is equal in all the bar type electrodes. For attaining this feature in the present invention, the electrodes are arranged so that one bar type electrode is located at the center of an equilateral hexagon and other electrodes are located at apexes of the equilateral hexagon. As the method for arranging bar type electrodes so that the distance between every two adjacent electrodes is equal, there can be mentioned a method in which 4 bar type electrodes are located at apexes of an equilateral tetragon, respectively. However, in order to make the equipment compact and arrange as many bar type electrodes as possible in a unit area, the equilateral hexagon arrangement as shown in FIGS. 5, 6 and 7 is more advantageous than the equilateral tetragon arrangement, and in such hexagon arrangement, bar type electrodes can be arranged most densely.

Figure 9:
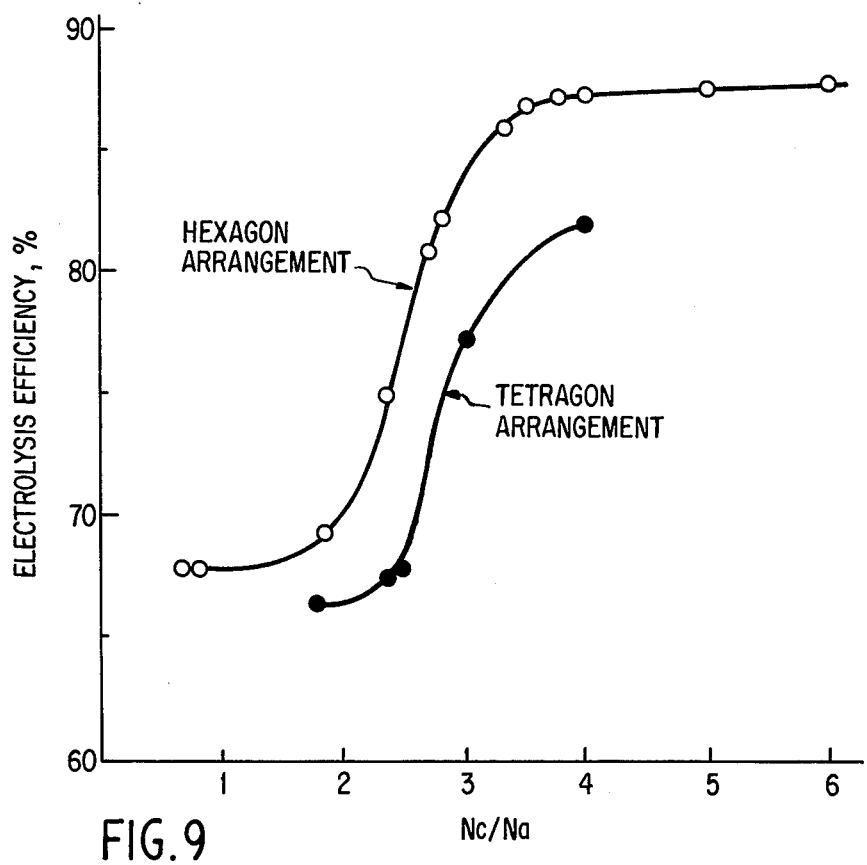
FIG. 9 is a view illustrating the relationship of the Nc/Na ratio to the electrolysis efficiency, which is observed when bar type electrodes are arranged in an equilateral hexagon and in a regular tetragon.

FIG. 9 illustrates the relationship of the above-mentioned Nc/Na ratio to the electrolysis efficiency, observed with respect to the equilateral hexagon arrangement in which one bar type electrode is located at the center of an equilateral hexagon and other bar type electrodes are located at apexes of the equilateral hexagon and the equilateral tetragon arrangement in which bar type electrodes are located at apexes of an equilateral tetragon. From FIG. 9, it will readily be understood that the electrolysis efficiency is remarkably influenced by the arrangement pattern of bar type electrodes and a much higher electrolysis efficiency can be attained by the equilateral hexagon arrangement. Of course, it is preferred that all the bar type electrodes be arranged so as to form such hexagonal patterns, but, needless to say, the arrangement of some of the bar type electrodes may be changed.

The present invention will now be described in detail by reference to the following Examples.

EXAMPLE 1

Twelve small holes 16 were formed on each of the peripheral side faces of water chambers 5 and 8 of a cylindrical electrolytic cell proper 1 having an outer diameter of 120 mm, a thickness of 10 mm and a height of 1200 mm and being composed of an acrylic resin, and anodic bar type electrodes 2 formed by plating platinum on a titanium rod having a diameter of 8 mm and cathodic bar type electrodes 3 (ordinary steel rods having a diameter of 8 mm) were disposed in the cell proper 1 according to the electrode arrangement shown in FIG. 5 (the distance between every two adjacent electrodes was 5 mm). Each of the electrodes 2 and 3 had an effective length of 1000 mm and an effective surface area of 2.51 dm$^2$.

Sea water flowed at a rate of 0.5 m/sec in the electrolytic cell having the above structure and the electrolytic treatment was conducted for 1 month while applying an overall electric current of 465 – 1395 A. The efficiency of generation of chlorine was calculated from the amount of sodium hypochlorite formed by the treatment to obtain results shown in Table 1.

Table 1

| Overall Current (A) | Current Density (A/dm$^2$) on Anodes | Chlorine Generation Efficiency (%) |
| --- | --- | --- |
| 465 | 5 | 85 |
| 697.5 | 7.5 | 87 |
| 930 | 10 | 87 |
| 1395 | 15 | 85 |

As will be apparent from the data shown in Table 1, according to the electrolytic cell of the present invention, a chlorine generation efficiency of 85 to 87%, which value is much high than a chlorine generation efficiency of 60 to 70% attainable in a conventional electrolytic cell including platinum-plated titanium electrodes, could be obtained. Further, it was confirmed that even after the operation had been conducted continuously for 1 month, the amount of magnesium hydroxide deposited on the cathodes was very small.

EXAMPLE 2

By using an electrolytic cell having a scale the same as that of the cell used in Example 1 and also using the same anodes and cathodes as employed in Example 1, sea water was subjected to the electrolysis treatment. Bar type electrodes 2 and 3 used as anodes and cathodes were arranged in the manner as shown in FIG. 6 or 7. Sea water flowed at a rate of 1m/sec into the electrolytic cell and the electrolytic treatment was conducted at an anode current density of 10 A/dm$^2$ for 2 months. Obtained results are shown in Table 2.

Table 2

| Arrangement of Anodes and Cathodes | Total Area (dm$^2$) of Anodes | Chlorine Generation Efficiency (%) |
| --- | --- | --- |
| pattern shown in Fig. 6 | 83 | 87 |
| pattern shown in FIG. 7 | 75 | 88 |

As will be apparent from the results shown in Table 2, a very high chlorine generation efficiency could be attained in the electrolytic cell having bar type electrodes arranged as shown in FIG. 6 or 7, and it was confirmed that even after 2 months' continuous operation, the amount of magnesium hydroxide deposited on the cathodes was very small in each case.

As will be apparent from the foregoing illustration, in the electrolytic cell of the present invention, streams of the electrolytic solution in the cell can be made much smoother and more uniform than in the conventional electrolytic cells, and local stagnation of the electrolytic solution can be completely prevented. Further, by virtue of the specific arrangement of a number of bar type electrodes 2 and 3, the electrolytic solution can be electrolytically treated very effectively and good results can be obtained at a high electrolysis efficiency. According to the structure of the present invention, a large number of electrodes can be arranged below a relatively compact equipment and the electrolytic cell of the present invention can be preferably and suitably applied to not only the electrolysis of sea water but also other various electrolysis treatments. Still further, the indispensable structure can be simplified, and assembling, manufacture and maintenance of the electrolytic cell can be remarkably facilitated. Therefore, the electrolytic cell of the present invention is very valuable as a versatile electrolytic cell having excellent capacities.

Obviously many modifications and variations of the present invention are possible in light of the above teachings. It is therefore to be understood that within the scope of the appended claims, the invention may be practiced otherwise than as specifically described herein.

What is claimed is:

1. An electrolytic cell for treatment of an electrolytic solution comprising a plurality of spaced apart and parallel monopolar bar type electrodes with clearances defined between said electrodes for receiving said electrolytic solution;

a cathode terminal and an anode terminal disposed at opposite ends of said electrodes;

at least one polar group of said electrodes arranged in said electrolytic cell so that one electrode is located at the center of an equilateral hexagon and other electrodes are located at apexes of said hexagon;

said plurality of monopolar bar type electrodes including a plurality of cathodic bar type electrodes and a plurality of anodic bar type electrodes wherein the ratio of the total number of cathodic bar type electrodes most adjacent to respective anodic bar type electrodes to the total number of the anodic bar type electrodes is at least 2.

2. An electrolytic cell as set forth in claim 1 wherein said ratio is from 2.5 to 4.

3. An electrolytic cell as set forth in claim 1 wherein both ends of said bar type electrodes are supported by a pair of insulating members, one end of said cathodic bar type electrodes is fitted in said insulating member on one side and one end of said anodic bar type electrodes is allowed to pierce through said insulating member on one side, the other end of said anodic bar type electrodes is fitted in said insulating member on the other side and the other end of said cathodic bar type electrodes is allowed to pierce through said insulating member on the other side, and wherein the piercing ends of said cathodic and anodic bar type electrodes are contacted said with cathodic terminals or said anodic terminals disposed outside said insulating members.

4. An electrolytic cell as set forth in claim 3 wherein both the insulating members and the bar type electrodes disposed between said insulating members are integrated by supporting rods connecting said insulating members to each other.

5. An electrolytic cell as set forth in claim 4 wherein said supporting rods are formed as cathodic or anodic electrodes.

6. An electrolytic cell as set forth in claim 3 wherein the piercing ends of said cathodic and anodic bar type electrodes are engaged with tulip-like holding pieces capable of elastic opening and closing, so that said piercing ends are dismountably engaged with said cathodic or anodic terminals.

7. An electrolytic cell as set forth in claim 1 wherein said cell has a cylindrical shape.

8. An electrolytic cell as set forth in claim 7 further comprising annular cylindrical water chambers formed on the peripheral faces of said electrolytic cell on first and second ends thereof, a number of communication holes are formed to communicate said water chambers with the interior of said electrolytic cell, and wherein water-sucking and water-discharging openings of said water chambers are located at the same level as the level of the end face of said electrolytic cell.

* * * * *